United States Patent
Kamiya et al.

(10) Patent No.: US 10,099,320 B2
(45) Date of Patent: Oct. 16, 2018

(54) HIGH CORROSION-RESISTANT ALUMINUM ALLOY BRAZING SHEET AND CHANNEL FORMING COMPONENT FOR VEHICULAR HEAT EXCHANGER USING SAME

(71) Applicants: DENSO CORPORATION, Kariya-shi, Aichi (JP); UACJ CORPORATION, Chiyoda-ku, Tokyo (JP)

(72) Inventors: Sadayuki Kamiya, Kariya (JP); Shota Terachi, Kariya (JP); Kenji Negura, Kariya (JP); Makoto Ando, Tokyo (JP); Atsushi Fukumoto, Tokyo (JP); Yoshiyuki Oya, Tokyo (JP); Akio Niikura, Tokyo (JP)

(73) Assignees: Denso Corporation, Aichi (JP); UACJ Corporation, Tokyo (JP)

( * ) Notice: Subject to any disclaimer, the term of this patent is extended or adjusted under 35 U.S.C. 154(b) by 743 days.

(21) Appl. No.: 14/374,969

(22) PCT Filed: Jan. 28, 2013

(86) PCT No.: PCT/JP2013/051785
§ 371 (c)(1),
(2) Date: Jul. 28, 2014

(87) PCT Pub. No.: WO2013/111904
PCT Pub. Date: Aug. 1, 2013

(65) Prior Publication Data
US 2015/0004428 A1     Jan. 1, 2015

(30) Foreign Application Priority Data

Jan. 29, 2012   (JP) ................................. 2012-016013

(51) Int. Cl.
*B32B 15/01*    (2006.01)
*B23K 35/02*    (2006.01)
(Continued)

(52) U.S. Cl.
CPC ........ *B23K 35/0238* (2013.01); *B23K 1/0014* (2013.01); *B23K 1/19* (2013.01);
(Continued)

(58) Field of Classification Search
None
See application file for complete search history.

(56) References Cited

U.S. PATENT DOCUMENTS 5,350,436 A * 9/1994 Takezoe ............... B23K 35/286
                                                     420/544
7,226,669 B2 * 6/2007 Benedictus .......... B23K 1/0012
                                                     148/523

(Continued)

FOREIGN PATENT DOCUMENTS

CN      1982047 A     6/2007
EP      1795294 A1    6/2007
(Continued)

OTHER PUBLICATIONS

References cited page of the Office Action dated Oct. 27, 2015 for the corresponding Chinese Patent Application No. 201380006589.X.

(Continued)

*Primary Examiner* — Daniel J. Schleis
(74) *Attorney, Agent, or Firm* — Carrier Blackman & Associates, P.C.; Joseph P. Carrier; Anne G. Sabourin (57) ABSTRACT

An aluminum alloy brazing sheet having high corrosion resistance is provided, which develops the sacrificial anti-corrosion effect in both surfaces of the sheet, which has the brazing function in one of both the surfaces, and which prevents the occurrence of preferential corrosion. A channel forming component for a vehicular heat exchanger is also provided by utilizing the aluminum alloy brazing sheet. An aluminum alloy brazing sheet having high corrosion resis- (Continued)

tance includes an aluminum alloy core, a filler material clad on one surface of the core, and a sacrificial anode material clad on the other surface of the core, wherein the filler material, the sacrificial anode material, and the core have respective predetermined alloy compositions. A channel forming component for a vehicular heat exchanger is manufactured using the aluminum alloy brazing sheet having high corrosion resistance.

16 Claims, 2 Drawing Sheets

(51) Int. Cl.
  *B23K 1/19* (2006.01)
  *B23K 35/28* (2006.01)
  *B23K 35/22* (2006.01)
  *C22C 21/00* (2006.01)
  *B23K 1/00* (2006.01)
  *B23K 101/00* (2006.01)
  *B23K 101/14* (2006.01)
  *B23K 103/10* (2006.01)

(52) U.S. Cl.
  CPC .............. *B23K 35/22* (2013.01); *B23K 35/28* (2013.01); *B23K 35/288* (2013.01); *C22C 21/00* (2013.01); *B23K 2201/006* (2013.01); *B23K 2201/14* (2013.01); *B23K 2203/10* (2013.01); *Y10T 428/12222* (2015.01); *Y10T 428/12292* (2015.01)

(56) References Cited

U.S. PATENT DOCUMENTS

| | | | | |
|---|---|---|---|---|
| 8,668,993 | B2* | 3/2014 | Tatsumi | B23K 35/0272 |
| | | | | 165/905 |
| 9,327,365 | B2* | 5/2016 | Matsukado | B23K 35/0233 |
| 2010/0101688 | A1* | 4/2010 | Koshigoe | B23K 35/0238 |
| | | | | 148/535 |
| 2011/0100615 | A1 | 5/2011 | Henry et al. | |

FOREIGN PATENT DOCUMENTS

| | | | |
|---|---|---|---|
| JP | H07-088682 A | | 4/1995 |
| JP | H09-047893 A | | 2/1997 |
| JP | H0947893 A | | 2/1997 |
| JP | 2007-297673 A | | 11/2007 |
| JP | 2007-327093 A | | 12/2007 |
| JP | 2007-327094 A | | 12/2007 |
| JP | 2007327094 | * | 12/2007 |
| JP | 2008-188616 A | | 8/2008 |
| JP | 2008-246525 A | | 10/2008 |
| JP | 2009-228010 A | | 10/2009 |
| JP | 2011-524254 A | | 9/2011 |

OTHER PUBLICATIONS

Yang et al., "Development of solders for aluminum brazing", Locomotive & Rolling Stock Technology, 2007, pp. 1-4, Issue 1.

* cited by examiner

HIGH CORROSION-RESISTANT ALUMINUM ALLOY BRAZING SHEET AND CHANNEL FORMING COMPONENT FOR VEHICULAR HEAT EXCHANGER USING SAME

TECHNICAL FIELD

The present invention relates to an aluminum alloy brazing sheet having high corrosion resistance, and more particularly to a high corrosion resistant aluminum alloy brazing sheet suitably used as a constituting member of a channel for high temperature compressed air and a coolant in a heat exchanger, such as an intercooler. In addition, the present invention relates to a channel forming component for a vehicular heat exchanger, the component being made of the high corrosion resistant aluminum alloy brazing sheet.

BACKGROUND ART

An aluminum alloy is light-weight, has high thermal conductivity, and can realize high corrosion resistance with proper treatment. Therefore, the aluminum alloy is used for a vehicular heat exchanger, such as a radiator, a condenser, an evaporator, a heater, and an intercooler. As materials of tubes for vehicular heat exchangers, there are used a two-layer clad strip formed by employing an Al—Mn based alloy, e.g., a 3003 aluminum alloy, as a core, clad with a filler material made of an Al—Si based alloy or a sacrificial anode material made of an Al—Zn based alloy on one surface of the core, and a three-layer clad strip formed by further cladding the filler material made of the Al—Si based alloy on the other surface of the core. In the heat exchangers, such a clad strip and corrugated fins are usually combined and joined to each other by brazing them at high temperature of about 600° C.

When a corrosive liquid is present inside and/or outside a tube in the heat exchanger, there is a possibility that the tube is burst because the tube may thoroughly be holed due to pitting corrosion and because a wall thickness of the tube may be reduced due to uniform corrosion which causes reduction of compression strength (pressure capacity). This leads to a risk that air, cooling water or a coolant circulating inside the tube may leak. Hitherto, inner and outer surfaces of a tube in a radiator, for example, are exposed to corrosive environment because cooling water flows inside the tube and a corrosive substance coming from external environment, e.g., snowmelt salt, adheres to the outer side of the tube. To cope with such a problem, the inner side of the tube is made corrosion resistant by cladding a sacrificial anode material thereto. For the outer side of the tube, Zn is added, for example, to the fins in order to make a pitting potential of the fins relatively lower and to utilize the sacrificial anticorrosion action developed by the fines without cladding a sacrificial layer to the tube itself. The reason why the outer side of the tube can be made corrosion resistant by the above-mentioned method resides in that the corrosive liquid adhering to the outer side of the tube has high electric conductivity. Electrical conductivity of the corrosive liquid rises as the concentration of a solute component in the corrosive liquid increases. In the external environment of the radiator, the corrosive liquid containing the solute component, such as snowmelt salt, at a high concentration, adheres to the outer side of the tube, thus providing high electric conductivity. Accordingly, the entire tube can sufficiently be made corrosion resistant with the sacrificial effect of the fins.

In a new heat exchanger used in recent vehicles, however, it is required to employ a tube clad with sacrificial layers on both the inner and outer sides of the tube. One example of such a heat exchanger is a water-cooled intercooler. In the water-cooled intercooler, of inner and outer surfaces of a tube, the surface on one side contacting with cooling water is exposed to corrosive environment as in the conventional radiator, and therefore it requires cladding of a sacrificial anode material. On the other hand, the tube surface on the opposite side is contacted with compressed air mixed with exhaust gas. In that case, the compressed air cooled in the heat exchanger causes dewing of condensate water in which exhaust gas is dissolved. The condensate water contains a chloride ion that is a component of the exhaust gas, and hence has pitting inductivity. For that reason, sacrificial corrosion resistance is also required on the tube surface on the side exposed to the compressed air. However, because the solute component in the condensate water is rare and the tube is in environment not immersed in water, it is difficult to develop the sacrificial anticorrosion action by the fins. Accordingly, the tube surface on the side exposed to the compressed air is needed to have both a superior brazing function for the fins and the sacrificial anticorrosion function.

Figure 2:
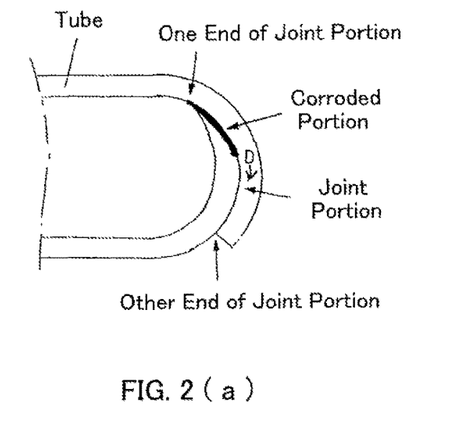
FIG. 2 is an explanatory view illustrating preferential corrosion in a tube made of a three layer aluminum alloy brazing sheet.

A tube illustrated in FIG. 2, for example, is formed in a tubular shape by brazing opposite ends of an aluminum alloy brazing sheet made up of three layers of filler material/core/sacrificial anode material to each other. The sacrificial anode material is coated on the inner surface side of the brazing sheet, and the filler material made of an Al—Si based alloy is coated on the outer surface side. One method for giving the sacrificial anticorrosion effect to the conventional filler material made of the Al—Si based alloy, in addition to the brazing function, is to add Zn to the filler material such that the pitting potential becomes relatively low. With that method, a filler metal melted from the Al—Si based alloy is collected and solidified in a joint portion during brazing. Because the Al—Si based alloy contains Zn, Zn is inevitably concentrated in a finally solidified portion. In such a state, the pitting potential of the joint portion becomes lowest and corrosion is preferentially generated in the joint portion. Because cooling water is filled in the tube of FIG. 2, the preferential corrosion progresses from one end of the joint portion to the other end as indicated by an arrow D in FIG. 2(a), and it eventually turns to a corroded portion as illustrated in FIG. 2(b).

Figure 3:
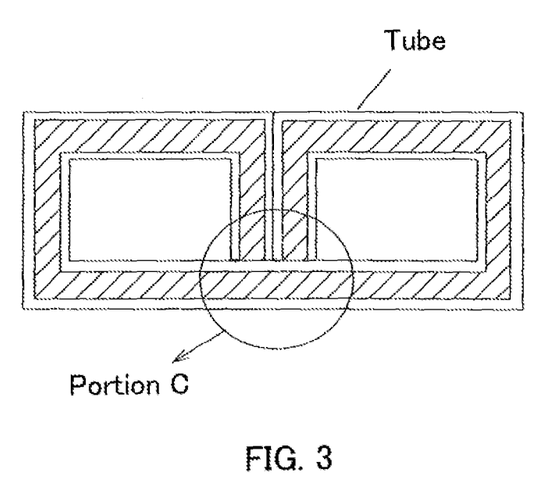
FIG. 3 is a sectional view of a tube made of the aluminum alloy brazing sheet and formed into a B-like cross-sectional shape.

Patent Documents 1 and 2 describe brazing sheets each including a clad layer that has both the brazing function and the sacrificial anticorrosion effect. Those brazing sheets are mainly used in a radiator in which cooling water flows inside a tube, aiming to assist brazing in a portion C of the tube that is formed into a B-like cross-sectional shape as illustrated in FIG. 3. In the brazing sheets according to those known techniques, however, the sacrificial anticorrosion with the tube itself is not taken into consideration for the outside of the tube, and the conventional filler material made of an Al—Si based alloy is just clad over the tube on the side exposed to outside air. Thus, in the above-cited Patent Documents, no considerations are paid to the preferential corrosion in the joint portion between tube materials.

In more detail, the brazing sheet described in Patent Document 1 enables the tube materials of B-shaped to be brazed. Composition of a clad layer is set so as to reduce a Si amount in comparison with that in the usual filler material made of the Al—Si based alloy, and to prevent reduction of the sacrificial anticorrosion effect due to drift of the melted filler metal. However, Patent Document 1 just states that an amount of Zn added to the filler material is not more than 7%. It does not take into account how to suppress concentration of Zn into the joint portion. Stated another way, prevention of the preferential corrosion in the tube joint portion is not dealt with in Patent Document 1.

On the other hand, a clad layer having both the brazing function and the sacrificial anticorrosion effect, described in Patent Document 2, is added with Cu and Mn in addition to Si and Zn. However, addition of Cu and Mn aims to increase strength instead of aiming to prevent the preferential corrosion in the tube joint portion. Furthermore, the sacrificial anticorrosion effect with the clad layer is targeted on the cooling-water side of the tube, and a usual filler alloy, e.g., a 4045 aluminum alloy or a 4343 aluminum alloy, is employed on the atmosphere side. Thus, anticorrosion effect by the clad layer of the tube on the atmosphere side is not taken into consideration.

LIST OF PRIOR-ART DOCUMENTS

Patent Document

[Patent Document 1] JP 2008-188616 A
[Patent Document 2] JP 2011-524254 A

SUMMARY OF INVENTION

Problems to be Solved by Invention

As described above, when the aluminum alloy brazing sheet is used as a material for the tube in the heat exchanger, for example, the known techniques have a difficulty in providing an aluminum alloy brazing sheet which develops the sacrificial anticorrosion effect in both the inner and outer surfaces of the tube, which has the brazing function in one of both the inner and outer surfaces, and which does not cause the preferential corrosion between the tube materials, under a situation where both the inner and outer surfaces of the tube are exposed to corrosive environment and the sacrificial anticorrosion effect with a fin is hard to develop in joint surface between the tube and the fin.

The present invention has been accomplished with intent to solve the above-described problems, and an object of the present invention is to provide an aluminum alloy brazing sheet having high corrosion resistance, which develops the sacrificial anticorrosion effect in both surfaces of the sheet, which has the brazing function in one of both the surfaces, which prevents the preferential corrosion in a brazed portion, and which exhibits satisfactory brazability without causing diffusion of a melted filler metal into a core during brazing, and to provide a channel forming component for a vehicular heat exchanger by employing the above-mentioned aluminum alloy brazing sheet. The aluminum alloy brazing sheet having high corrosion resistance can suitably be used as the channel forming component for the vehicular heat exchanger.

Means for Solving Problems

As a result of intensively conducting studies on the above-described problems, the inventors have accomplished the present invention based on the finding that those problems can be solved by preparing a clad strip made up of a filler material, a core, and a sacrificial anode material, each of which has a specific alloy composition.

More specifically, according to a first aspect of the present invention, in an aluminum alloy brazing sheet having high corrosion resistance, the aluminum alloy brazing sheet including an aluminum alloy core, a filler material clad on one surface of the core, and a sacrificial anode material clad on the other surface of the core, wherein the filler material is made of an aluminum alloy containing Si: 2.5 to 13.0 mass %, Zn: 0.5 to 5.5 mass %, Cu: 0.1 to 0.6 mass %, and Fe: 0.05 to 1.0 mass % with the balance being Al and inevitable impurities, the sacrificial anode material is made of an aluminum alloy containing Zn: 0.5 to 6.0 mass %, Si: 0.05 to 1.5 mass %, and Fe: 0.05 to 2.0 mass % with the balance being Al and inevitable impurities, and the core is made of an aluminum alloy containing Si: 0.05 to 1.2 mass %, Fe: 0.05 to 1.0 mass %, Cu: 0.05 to 1.2 mass %, and Mn: 0.6 to 1.8 mass % with the balance being Al and inevitable impurities.

According to a second aspect of the present invention, in the first aspect mentioned above, at least one of the filler material and the sacrificial anode material contains, in addition to the aforesaid component elements, one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %.

According to a third aspect of the present invention, in the first or second aspect mentioned above, the core further contains, in addition to the aforesaid component elements, one or more selected from Mg: 0.05 to 0.5 mass %, Ti: 0.05 to 0.3 mass %, Zr: 0.05 to 0.3 mass %, Cr: 0.05 to 0.3 mass %, and V: 0.05 to 0.3 mass %.

According to a fourth aspect of the present invention, in any one of the first to third aspects mentioned above, a difference in pitting potential between a filler material surface and the core after heating for brazing is not less than 20 mV, and a pitting potential at a sacrificial anode material surface after the heating for the brazing is equal to or lower than a pitting potential of an eutectic structure in the filler material.

According to a fifth aspect of the present invention, in any one of the first to fourth aspects mentioned above, the aluminum alloy brazing sheet is formed as a channel forming component for a vehicular heat exchanger, the channel forming component having one surface defining a channel for a cooling liquid and the other surface being contacted with air, and the channel forming component being used in environment where condensate water is generated on the other surface of the channel forming component, a total value of solute concentration of the condensate water being not more than 10000 ppm and the condensate water containing a chloride ion of not less than 5 ppm and not more than 500 ppm.

Moreover, according to a sixth aspect of the present invention, a channel forming component for a vehicular heat exchanger is manufactured by brazing the aluminum alloy brazing sheet having high corrosion resistance according to the fifth aspect mentioned above.

Advantageous Effect of Invention

According to the present invention, there is provided the aluminum alloy brazing sheet having high corrosion resistance, which develops the sacrificial anticorrosion effect in both the inner and outer surfaces of the tube, which has the brazing function in one of both the inner and outer surfaces, and which prevents the occurrence of the preferential corrosion at the joint portion between the tube materials, under a situation where both the inner and outer surfaces of the tube are exposed to corrosive environment and the sacrificial anticorrosion effect with a fin is hard to develop in a joint surface between the tube and the fin, when the aluminum alloy brazing sheet is used as the material for the tube in the heat exchanger. In addition, the channel forming component for the vehicular heat exchanger is provided which is made of the aluminum alloy brazing sheet. The aluminum alloy brazing sheet can suitably be used as the material for the tube in the vehicular heat exchanger because it is superior in not only brazability, such as a fin joining rate and erosion resistance, but also in lightweight properties and thermal conductivity.

MODE FOR CARRYING OUT INVENTION

Preferred embodiments of an aluminum alloy brazing sheet having high corrosion resistance according to the present invention and a method of manufacturing the aluminum alloy brazing sheet will be described in detail below.
1. Corrosive Environment First, corrosive environment will be explained in which the present invention is employed with prominent superiority to the prior art, and in which an advantageous effect, such as high corrosion resistance, is maximally developed. When the aluminum alloy brazing sheet having high corrosion resistance according to the present invention is used as a channel forming component for a vehicular heat exchanger, for example, one surface of the brazing sheet defines a channel for a cooling liquid, and the other surface thereof contacts with air. The advantageous effect of the present invention is maximally developed when condensate water is generated on the other surface of the brazing sheet. A total value of solute concentration of the condensate water is not more than 10000 ppm while the condensate water contains a chloride ion of not less than 5 ppm and not more than 500 ppm.

In such corrosive environment, because the condensate water has pitting inductivity, sacrificial anticorrosion effect is required. However, the sacrificial anticorrosion effect by the fin does not effectively develop for the reason that the solute concentration is low and the environment is not in a state immersed in water. It is hence conceivable to add Zn to the usually-employed filler material made of the Al—Si based alloy such that the sacrificial anticorrosion effect is given to the tube itself. However, such a solution raises such a problem that Zn is concentrated in a joint portion between tube materials and that the Zn-concentrated portion causes the preferential corrosion.

The aluminum alloy brazing sheet having high corrosion resistance according to the present invention is intended to effectively solve the above-mentioned problem. When the concentration of the chloride ion in the condensate liquid is not more than 500 ppm and the total value of solute concentration is not more than 10000 ppm, the sacrificial anticorrosion effect by the fin is not effectively developed, and therefore the advantageous effect of the present invention is more effective. Even when the solute concentration of the condensate liquid is not more than 10000 ppm, a possibility of the occurrence of the preferential corrosion in the tube joint portion is low unless a sheet surface on the side opposite to the condensate liquid is not exposed to the corrosive environment such as including cooling water. Moreover, when the concentration of the chloride ion in the condensate liquid is not less than 5 ppm, the condensate water has pitting inductivity, and therefore the advantageous effect of the present invention is more effective.

A filler material, a sacrificial anode material and a core, which constitute the aluminum alloy brazing sheet having high corrosion resistance according to the present invention, will be described below.
2. Filler Material The filler material is made of an aluminum alloy containing Si: 2.5 to 13.0 mass %, Zn: 0.5 to 5.5 mass %, Cu: 0.1 to 0.6 mass %, and Fe: 0.05 to 1.0 mass %, as essential elements, with the balance being Al and inevitable impurities.

The filler material may further contain, as selective added element(s), one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %. In addition to the above-mentioned essential elements and selective added elements, the filler material may contain inevitable impurities not more than 0.05% for each impurity and not more than 0.15% in total. Individual components will be described below.
2-1. Si Addition of Si lowers the melting point of the filler material to generate a liquid phase, thus enabling the brazing to be performed. A Si content is 2.5 to 13.0 mass % (hereinafter mass % will be referred to simply as "%"). If the Si content is less than 2.5%, the liquid phase would be generated very slightly and the brazing function would be hard to develop. On the other hand, if the Si content is more than 13.0%, an amount of Si diffused into a counterpart member, e.g., a fin, would be excessive and melting of the counterpart member would be caused. A preferable Si content is 3.5 to 12.0%.
2-2. Zn Zn can make the pitting potential relatively lower and can increase the corrosion resistance with the sacrificial anticorrosion effect by producing a potential difference relative to the core. A Zn content is 0.5 to 5.5%. If the Zn content is less than 0.5%, the effect of increasing the corrosion resistance with the sacrificial anticorrosion effect would not be obtained sufficiently. On the other hand, if the Zn content is more than 5.5%, a corrosion rate would be increased and a sacrificial anticorrosion layer would be lost earlier, thus reducing the corrosion resistance. A preferable Zn content is 0.5 to 4.5%.
2-3. Cu Cu acts to make the pitting potential relatively higher. When a proper amount of Cu is added, the pitting potential of the joint portion can be prevented from becoming too low for the reason that even when Zn is concentrated in the tube joint portion as described above, Cu is also concentrated similarly. A Cu content is 0.1 to 0.6%. If the Cu content is less than 0.1%, the effect of making the pitching potential of the joint portion relatively high would not be obtained sufficiently. On the other hand, if the Cu content is more than 0.6%, the pitching potential of the sacrificial anticorrosion layer would become relatively high and the sacrificial anti-corrosion effect would be lost earlier, thus reducing the corrosion resistance. A preferable Cu content is 0.1 to 0.4%.

2-4. Fe

Because of having a tendency to form an Al—Fe based or an Al—Fe—Si based intermetallic compound, Fe acts to reduce the amount of Si that is effective in the brazing, thus degrading the brazability. A Fe content is 0.05 to 1.0%. If the Fe content is less than 0.05%, a high-purity aluminum metal would have to be used and the cost would be increased. On the other hand, if the Fe content is more than 1.0%, the brazing would be insufficient due to the above-described action of Fe. A preferable Fe content is 0.1 to 0.5%.

2-5. Mn

The filler material may contain Mn because Mn increases the strength and the corrosion resistance. A Mn content is 0.05 to 1.8%. If the Mn content is more than 1.8%, a giant intermetallic compound would tend to be formed during casting, thus degrading plastic workability, and the potential of the sacrificial anode layer would become relatively high, thus degrading the sacrificial anticorrosion effect and reducing the corrosion resistance. On the other hand, if the Mn content is less than 0.05%, the effect of Mn would not be obtained sufficiently. A preferable Mn content is 0.05 to 1.5%.

2-6. Ti

The filler material may contain Ti because Ti increases the strength by solid-solution strengthening and further increases the corrosion resistance. A Ti content is 0.05 to 0.3%. If the Ti content is less than 0.05%, the above-mentioned effect would not be obtained. If the Ti content is more than 0.3%, a giant intermetallic compound would tend to be formed, thus degrading plastic workability. A preferable Ti content is 0.1 to 0.2%.

2-7. Zr

The filler material may contain Zr because Zr acts to increase the strength by solid-solution strengthening, and to precipitate an Al—Zr based intermetallic compound, thereby coarsening grains after the brazing. A Zr content is 0.05 to 0.3%. If the Zr content is less than 0.05%, the above-mentioned effect would not be obtained. If the Zr content is more than 0.3%, a giant intermetallic compound would tend to be formed, thus degrading plastic workability. A preferable Zr content is 0.1 to 0.2%.

2-8. Cr

The filler material may contain Cr because Cr acts to increase the strength by solid-solution strengthening, and to precipitate an Al—Cr based intermetallic compound, thereby coarsening grains after the brazing. A Cr content is 0.05 to 0.3%. If the Cr content is less than 0.05%, the above-mentioned effect would not be obtained. If the Cr content is more than 0.3%, a giant intermetallic compound would tend to be formed, thus degrading plastic workability. A preferable Cr content is 0.1 to 0.2%.

2-9. V

The filler material may contain V because V increases the strength by solid-solution strengthening and further increases the corrosion resistance. A V content is 0.05 to 0.3%. If the V content is less than 0.05%, the above-mentioned effect would not be obtained. If the V content is more than 0.3%, a giant intermetallic compound would tend to be formed, thus degrading plastic workability. A preferable V content is 0.1 to 0.2%.

At least one of those elements Mn, Ti, Zr, Cr and V is added to the filler material where necessary.

3. Sacrificial Anode Material

The sacrificial anode material is made of an aluminum alloy containing Zn: 0.5 to 6.0 mass %, Si: 0.05 to 1.5 mass %, and Fe: 0.05 to 2.0 mass %, as essential elements, with the balance being Al and inevitable impurities.

The sacrificial anode material may further contain, as selective additional element(s), one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %. In addition to the above-mentioned essential elements and selective additional elements, the sacrificial anode material may contain inevitable impurities not more than 0.05% for each impurity and not more than 0.15% in total. Individual components will be described below.

3-1. Zn

Zn can make the pitting potential relatively lower and can increase the corrosion resistance by the sacrificial anode effect with producing a potential difference relative to the core. A Zn content is 0.5 to 6.0%. If the Zn content is less than 0.5%, the effect of increasing the corrosion resistance by the sacrificial anode effect would not be obtained sufficiently. On the other hand, if the Zn content is more than 6.0%, the corrosion rate would be increased and the sacrificial anticorrosion layer would be lost earlier, thus reducing the corrosion resistance. A preferable Zn content is 1.0 to 5.0%.

3-2. Si

Si forms an Al—Fe—Mn—Si based intermetallic compound together with Fe and Mn, thus increasing the strength by dispersion strengthening, or it dissolves in an aluminum matrix in a solid state, thus increasing the strength by solid-solution strengthening. Moreover, Si increases the strength by reacting with Mg diffused from the core during the brazing and by forming a $Mg_2Si$ compound. A Si content is 0.05 to 1.5%. If the Si content is less than 0.05%, a high-purity aluminum metal would have to be used and the cost would be increased. On the other hand, if the Si content is more than 1.5%, the melting point of the sacrificial anode material would be reduced to such an extent as causing melting of the sacrificial anode material. Moreover, the potential of the sacrificial anode material would become relatively high, thus degrading the sacrificial anode effect and reducing the corrosion resistance. A preferable Si content is 0.05 to 1.2%.

3-3. Fe

Fe forms an Al—Fe—Mn—Si based intermetallic compound together with Si and Mn, thus increasing the strength by dispersion strengthening. A Fe content is 0.05 to 2.0%. If the Fe content is less than 0.05%, a high-purity aluminum metal would have to be used and the cost would be increased. On the other hand, if the Fe content is more than 2.0%, a giant intermetallic compound would tend to be formed during casting, thus degrading plastic workability. A preferable Fe content is 0.05 to 1.5%.

3-4. Mn

The sacrificial anode material may contain Mn because Mn increases the strength and the corrosion resistance. A Mn content is 0.05 to 1.8%. If the Mn content is more than 1.8%, a giant intermetallic compound would tend to be formed during casting, thus degrading plastic workability, and the potential of the sacrificial anode material would become relatively high, thus degrading the sacrificial anode effect and reducing the corrosion resistance. On the other hand, if the Mn content is less than 0.05%, the effect of Mn would not be obtained sufficiently. A preferable Mn content is 0.05 to 1.5%.

3-5. Ti

The sacrificial anode material may contain Ti because Ti increases the strength by solid-solution strengthening and further increases the corrosion resistance. A Ti content is 0.05 to 0.3%. If the Ti content is less than 0.05%, the above-mentioned effect would not be obtained. If the Ti content is more than 0.3%, a giant intermetallic compound would tend to be formed, thus degrading plastic workability. A preferable Ti content is 0.05 to 0.2%.

3-6. Zr

The sacrificial anode material may contain Zr because Zr acts to increase the strength by solid-solution strengthening, and to precipitate an Al—Zr based intermetallic compound, thereby coarsening grains after the brazing. A Zr content is 0.05 to 0.3%. If the Zr content is less than 0.05%, the above-mentioned effect would not be obtained. If the Zr content is more than 0.3%, a giant intermetallic compound would tend to be formed, thus degrading plastic workability. A preferable Zr content is 0.1 to 0.2%.

3-7. Cr

The sacrificial anode material may contain Cr because Cr acts to increase the strength by solid-solution strengthening, and to precipitate an Al—Cr based intermetallic compound, thereby coarsening grains after the brazing. A Cr content is 0.05 to 0.3%. If the Cr content is less than 0.05%, the above-mentioned effect would not be obtained. If the Cr content is more than 0.3%, a giant intermetallic compound would tend to be formed, thus degrading plastic workability. A preferable Cr content is 0.1 to 0.2%.

3-8. V

The sacrificial anode material may contain V because V increases the strength by solid-solution strengthening and further increases the corrosion resistance. A V content is 0.05 to 0.3%. If the V content is less than 0.05%, the above-mentioned effect would not be obtained. If the V content is more than 0.3%, a giant intermetallic compound would tend to be formed, thus degrading plastic workability. A preferable V content is 0.05 to 0.2%.

At least one of those elements Mn, Ti, Zr, Cr and V is added to the sacrificial anode material where necessary.

4. Core

The core is made of an aluminum alloy containing Si: 0.05 to 1.2 mass %, Fe: 0.05 to 1.0 mass %, Cu: 0.05 to 1.2 mass %, and Mn: 0.6 to 1.8 mass %, as essential elements, with the balance being Al and inevitable impurities.

The core may further contain, as selective additional element(s), one or more selected from Mg: 0.05 to 0.5 mass %, Ti: 0.05 to 0.3 mass %, Zr: 0.05 to 0.3 mass %, Cr: 0.05 to 0.3 mass %, and V: 0.05 to 0.3 mass %.

In addition to the above-mentioned essential elements and selective additional elements, the core may contain inevitable impurities not more than 0.05% for each impurity and not more than 0.15% in total.

The aluminum alloy used for the core in the present invention is suitably an Al—Mn based alloy represented by a JIS 3000-series aluminum alloy, such as a JIS 3003 alloy. Individual components will be described below.

4-1. Si

Si forms an Al—Mn—Si based intermetallic compound together with Mn, thus increasing the strength by dispersion strengthening, or it dissolves in an aluminum matrix in a solid state, thus increasing the strength by solid-solution strengthening. A Si content is 0.05 to 1.2%. If the Si content is less than 0.05%, the above-mentioned effect would be insufficient. On the other hand, if the Si content is more than 1.2%, there increases a possibility that the melting point of the core would be reduced to such an extent as causing melting of the core. A preferable Si content is 0.1 to 1.0%.

4-2. Fe

Fe tends to form an intermetallic compound in such size as being able to serve as a recrystallization nucleus, thus increasing diameters of grains after the brazing and further suppressing diffusion of the filler metal from the filler material into the core. A Fe content is 0.05 to 1.0%. If the Fe content is less than 0.05%, a high-purity aluminum metal would have to be used and the cost would be increased. On the other hand, if the Fe content is more than 1.0%, the diameters of the grains after the brazing would be so small as to cause diffusion of the filler metal. A preferable Fe content is 0.1 to 0.5%.

4-3. Cu

Cu increases the strength by solid-solution strengthening. A Cu content is 0.05 to 1.2%. If the Cu content is less than 0.05%, the above-mentioned strengthening effect would be insufficient. If the Cu content is more than 1.2%, a possibility of causing cracking of the aluminum alloy during casting would be increased. A preferable Cu content is 0.3 to 1.0%.

4-4. Mn

Mn forms an Al—Mn—Si based intermetallic compound together with Si, thus increasing the strength by dispersion strengthening, or it dissolves in an aluminum matrix in a solid state, thus increasing the strength by solid-solution strengthening. A Mn content is 0.6 to 1.8%. If the Mn content is less than 0.6%, the above-mentioned effect would be insufficient. If the Mn content is more than 1.8%, a giant intermetallic compound would tend to be formed during casting, thus degrading plastic workability. A preferable Mn content is 0.8 to 1.6%.

4-5. Mg

The core may contain Mg because Mg increases the strength with precipitation of $Mg_2Si$. A Mg content is 0.05 to 0.5%. If the Mg content is less than 0.05%, the above-mentioned effect would be insufficient. If the Mg content is more than 0.5%, the brazing would be difficult to carry out. A preferable Mg content is 0.15 to 0.4%.

4-6. Ti

The core may contain Ti because Ti increases the strength by solid-solution strengthening. A Ti content is 0.05 to 0.3%. If the Ti content is less than 0.05%, the above-mentioned effect would be insufficient. If the Ti content is more than 0.3%, a giant intermetallic compound would tend to be formed, thus degrading plastic workability. A preferable Ti content is 0.1 to 0.2%.

4-7. Zr

The core may contain Zr because Zr acts to increase the strength by solid-solution strengthening, and to precipitate an Al—Zr based intermetallic compound, thereby coarsening grains after the brazing. A Zr content is 0.05 to 0.3%. If the Zr content is less than 0.05%, the above-mentioned effect would not be obtained. If the Zr content is more than 0.3%, a giant intermetallic compound would tend to be formed, thus degrading plastic workability. A preferable Zr content is 0.1 to 0.2%.

4-8. Cr

The core may contain Cr because Cr acts to increase the strength by solid-solution strengthening, and to precipitate an Al—Cr based intermetallic compound, thereby coarsening grains after the brazing. A Cr content is 0.05 to 0.3%. If the Cr content is less than 0.05%, the above-mentioned effect would not be obtained. If the Cr content is more than 0.3%, a giant intermetallic compound would tend to be formed, thus degrading plastic workability. A preferable Cr content is 0.1 to 0.2%.

4-9. V

The core may contain V because V increases the strength by solid-solution strengthening and further increases the corrosion resistance. A V content is 0.05 to 0.3%. If the V content is less than 0.05%, the above-mentioned effect would not be obtained. If the V content is more than 0.3%, a giant intermetallic compound would tend to be formed, thus degrading plastic workability. A preferable V content is 0.1 to 0.2%.

At least one of those elements Mg, Ti, Zr, Cr and V is added to the core where necessary.

5. Pitting Potential after Heating for Brazing

A tube shaped as illustrated in FIG. 2, for example, is joined such that a filler metal that has melded by heating for the brazing fills the joint portion and is solidified by subsequent cooling. If the tube after the brazing includes a region having a lower pitting potential than the surroundings, corrosion preferentially occurs in such a region. In that state after the brazing, when the pitting potential at the sacrificial anode material surface is equal to or lower than that of a eutectic structure of the filler material, the sacrificial anode material surface preferentially corrodes, and preferential corrosion in the joint portion does not occur. However, when the pitting potential of the eutectic structure of the filler material in the joint portion is lower than that in a surrounding region, the preferential corrosion occurs in the joint portion which leads to generation of a penetration hole in the channel forming component. It is to be noted that, although the pitting potential of the eutectic structure is the same in the joint portion and other regions, the pitting potential of the eutectic structure in regions other than the joint portion does not affect the preferential corrosion in the joint portion.

On the other hand, the filler material after the brazing is needed to have the so-called sacrificial anode effect, i.e., the effect of causing the filler material surface to more preferentially corrode than the core. When a difference in pitting potential between the filler material surface and the core after the brazing is not smaller than 20 mV, the sacrificial anode effect is developed due to the difference in pitting potential, and a penetration hole can be prevented from being generated with corrosion progressing from the filler material side. When the difference in pitting potential between the filler material surface and the core after the brazing is smaller than 20 mV, the sacrificial anode effect due to the difference in pitting potential is insufficient, and a penetration hole is generated with corrosion progressing from the filler material side. Here, the difference in pitting potential between the filler material surface and the core after the brazing is defined as a value obtained by subtracting the pitting potential at the filler material surface from the pitting potential of the core after the brazing.

As described above, it is required in the brazing sheet according to the present invention that, in the state after the brazing, respective pitting potentials satisfy appropriate relationships between the eutectic structure of the filler material in the joint portion and the sacrificial anode material surface and between the filler material surface and the core. In the present invention, those relationships in the pitting potential are achieved by adding both of Zn and Cu in appropriate amounts to the filler material made of the Al—Si based alloy. More specifically, the addition of Cu to the filler material provides such an effect that Cu is concentrated in the joint portion after the brazing and the concentrated Cu makes the pitting potential relatively high. As a result, lowering of the pitting potential caused by concentration of Zu can be cancelled out.

Conditions under which the brazing is performed here are not limited to particular ones. Usually, the brazing is performed by applying fluoride-based flux and then heating the joint portion to about 600° C. in a furnace under nitrogen atmosphere.

6. Manufacturing Method

A process for manufacturing the aluminum alloy brazing sheet having high corrosion resistance, according to the present invention, includes steps of:

casting respective ingots of the core made of the aluminum alloy, the sacrificial anode material, and the filler material made of the Al—Si based alloy;

hot-rolling the respective ingots of the sacrificial anode material and the filler material made of the Al—Si based alloy;

hot clad-rolling a composite laminate into a clad strip after overlaying the hot-rolled sacrificial anode material on one surface of the core ingot and overlaying the hot-rolled filler material made of the Al—Si based alloy on the other surface of the core ingot to make the composite laminate;

cold-rolling the resulting clad strip; and annealing the clad strip during or after the cold rolling.

Conditions in the casting step are not limited to particular ones. Usually, the casting step is performed by water-cooled semi-continuous casting. In each of the hot rolling step and the hot clad-rolling step, heating temperature is usually preferably set to about 400 to 560° C. If the heating temperature is lower than 400° C., plastic workability would be so poor as to cause edge cracking during the rolling. In the hot clad-rolling step, it would be difficult to press-bond the filler material and the sacrificial anode material to the core, and the hot rolling would not be performed normally in some cases. On the other hand, if the heating temperature is higher than 560° C., there is a possibility that the filler material would be melted during the heating.

The annealing step is usually preferably performed at temperature of about 100 to 560° C. for the purpose of reducing working strain during the rolling. If the temperature is lower than 100° C., the effect of the annealing would be insufficient in some cases. If the temperature is higher than 560° C., there is a possibility that the filler material would be melted. The annealing step may be performed using a batch-type furnace or a continuous-type furnace. While the annealing step is performed at least once during or after the cold rolling, there is no upper limit in the number of annealing steps to be preformed.

The cast ingot of the aluminum alloy core may be subjected to a homogenizing step before the hot clad-rolling step. The homogenizing step is usually preferably performed at temperature of about 450 to 620° C. If the temperature is lower than 450° C., the effect of the homogenizing would be insufficient in some cases. If the temperature is higher than 620° C., there is a possibility that the core ingot would be melted.

The thickness of the aluminum alloy brazing sheet having high corrosion resistance, and respective cladding rates of a filler material layer and a sacrificial anode material layer in the present invention are not limited to particular ones. When the brazing sheet is used as the material for the tube in the vehicular heat exchanger, the brazing sheet can usually be prepared as a thin brazing sheet having a thickness not more than about 0.6 mm. However, the thickness of the brazing sheet is not limited to such a range, and the brazing sheet can also be used as a relatively thick sheet having a thickness of about 0.6 mm or more to about 5 mm or less. The cladding rates of the filler material layer and the sacrificial anode material layer are each usually about 2 to 30%.

7. Channel Forming Component for Vehicular Heat Exchanger

A channel forming component, i.e., a tube, for a vehicular heat exchanger is manufactured by employing the above-described aluminum alloy brazing sheet having high corrosion resistance. For example, the brazing sheet is folded into the B-like cross-sectional shape, as illustrated in FIG. 3, and the brazing is performed by heating the folded sheet to about 600° C. after applying flux.

EXAMPLES

The present invention will be described in detail below in connection with Inventive Examples and Comparative Examples, but the present invention is not limited to the following examples.

Filler material alloys having alloy compositions listed in Table 1, sacrificial anode material alloys having alloy compositions listed in Table 2, and core alloys having alloy compositions listed in Table 3 were cast into ingots by DC casting, and the ingots were each finished by face milling of both surfaces thereof. Each ingot after the face milling had a thickness of 480 mm. The filler material and the sacrificial anode material were each subjected to a heating step at 520° C. for 3 hours, and then hot-rolled until reaching a thickness of 60 mm.

TABLE 1

| | Alloy Symbol | Alloy Composition (mass %) | | | | | | | | | |
|---|---|---|---|---|---|---|---|---|---|---|---|
| | | Si | Zn | Cu | Fe | Mn | Ti | Zr | Cr | V | Al |
| Inventive Example | A1 | 2.5 | 3.0 | 0.2 | 0.2 | 0.05 | — | — | — | — | balance |
| | A2 | 3.5 | 3.0 | 0.2 | 0.05 | — | 0.15 | — | — | — | balance |
| | A3 | 7.5 | 3.0 | 0.2 | 0.4 | — | — | — | — | 0.15 | balance |
| | A4 | 13.0 | 3.0 | 0.2 | 0.6 | 1.8 | — | — | — | — | balance |
| | A5 | 7.5 | 0.5 | 0.1 | 0.2 | — | — | — | — | — | balance |
| | A6 | 7.5 | 0.5 | 0.4 | 0.2 | — | 0.05 | 0.05 | 0.05 | 0.05 | balance |
| | A7 | 7.5 | 0.5 | 0.6 | 1.0 | — | — | 0.15 | — | — | balance |
| | A8 | 7.5 | 5.5 | 0.1 | 0.2 | — | — | — | 0.15 | — | balance |
| | A9 | 7.5 | 5.5 | 0.4 | 0.2 | — | — | — | — | — | balance |
| | A10 | 7.5 | 5.5 | 0.6 | 0.2 | — | 0.3 | 0.3 | 0.3 | 0.3 | balance |
| Comparative Example | A11 | 2.0 | 3.0 | 0.2 | 0.2 | — | — | — | — | — | balance |
| | A12 | 14.0 | 3.0 | 0.2 | 0.2 | — | — | — | — | — | balance |
| | A13 | 7.5 | 5.5 | 0.7 | 0.2 | — | — | — | — | — | balance |
| | A14 | 7.5 | 0.5 | 0.05 | 0.2 | — | — | — | — | — | balance |
| | A15 | 7.5 | 6.0 | 0.6 | 0.2 | — | — | — | — | — | balance |
| | A16 | 7.5 | 6.0 | 0.4 | 0.2 | — | — | — | — | — | balance |
| | A17 | 7.5 | 0.4 | 0.1 | 0.2 | — | — | — | — | — | balance |
| | A18 | 7.5 | 3.0 | 0.2 | 1.1 | — | — | — | — | — | balance |
| | A19 | 7.5 | 3.0 | 0.2 | 0.4 | 2.0 | 0.4 | 0.4 | 0.4 | 0.4 | balance |

TABLE 2

| | Alloy symbol | Alloy Composition (mass %) | | | | | | | | |
|---|---|---|---|---|---|---|---|---|---|---|
| | | Zn | Si | Fe | Mn | Ti | Zr | Cr | V | Al |
| Inventive Example | B1 | 2.0 | 0.2 | 0.2 | — | — | — | — | — | balance |
| | B2 | 0.5 | 0.05 | 0.05 | — | 0.15 | — | — | — | balance |
| | B3 | 5.0 | 0.4 | 0.4 | 0.05 | — | — | — | 0.15 | balance |
| | B4 | 6.0 | 0.6 | 0.6 | 1.5 | — | — | — | — | balance |
| | B5 | 2.0 | 1.5 | 0.2 | — | 0.05 | 0.05 | 0.05 | 0.05 | balance |
| | B6 | 2.0 | 0.2 | 2.0 | — | — | — | 0.15 | — | balance |
| | B7 | 2.0 | 0.2 | 0.2 | 1.8 | 0.3 | 0.3 | 0.3 | 0.3 | balance |
| Comparative Example | B8 | 2.0 | 1.7 | 0.2 | — | — | — | — | — | balance |
| | B9 | 2.0 | 0.2 | 2.2 | — | — | — | — | — | balance |
| | B10 | 2.0 | 0.2 | 0.2 | 2.0 | 0.4 | 0.4 | 0.4 | 0.4 | balance |
| | B11 | 0.4 | 0.2 | 0.2 | — | — | — | — | — | balance |
| | B12 | 6.5 | 0.2 | 0.2 | — | — | — | — | — | balance |

TABLE 3

| | Alloy symbol | Alloy Composition (mass %) | | | | | | | | | |
|---|---|---|---|---|---|---|---|---|---|---|---|
| | | Si | Fe | Cu | Mn | Mg | Ti | Zr | Cr | V | Al |
| Inventive Example | C1 | 0.5 | 0.4 | 0.5 | 1.1 | — | — | — | — | — | balance |
| | C2 | 0.5 | 0.6 | 0.5 | 1.1 | 0.5 | 0.05 | 0.05 | — | — | balance |
| | C3 | 1.0 | 0.8 | 1.0 | 1.5 | 0.05 | — | — | — | — | balance |
| | C4 | 0.05 | 1.0 | 0.5 | 1.1 | — | — | — | 0.05 | 0.05 | balance |
| | C5 | 0.5 | 0.05 | 0.05 | 1.1 | — | 0.30 | — | — | — | balance |
| | C6 | 0.5 | 0.2 | 0.5 | 0.6 | — | — | 0.30 | 0.30 | — | balance |
| | C7 | 1.2 | 0.2 | 0.5 | 1.8 | — | 0.05 | 0.05 | — | — | balance |
| | C8 | 0.5 | 0.2 | 1.2 | 1.1 | — | — | — | — | 0.30 | balance |

TABLE 3-continued

| | Alloy symbol | Alloy Composition (mass %) | | | | | | | | |
|---|---|---|---|---|---|---|---|---|---|---|
| | | Si | Fe | Cu | Mn | Mg | Ti | Zr | Cr | V | Al |
| Com-parative Example | C9 | 1.4 | 0.2 | 0.2 | 1.1 | — | — | — | — | — | balance |
| | C10 | 0.5 | 0.2 | 0.7 | 1.1 | 0.6 | — | 0.15 | — | — | balance |
| | C11 | 0.8 | 1.2 | 0.5 | 1.5 | — | 0.15 | 0.15 | — | — | balance |
| | C12 | 0.8 | 0.2 | 0.5 | 1.5 | — | 0.40 | 0.40 | 0.40 | 0.40 | balance |
| | C13 | 0.8 | 0.6 | 0.5 | 2.0 | — | — | — | — | — | balance |
| | C14 | 0.8 | 0.6 | 1.4 | 1.1 | — | — | — | — | — | balance |
| | C15 | 0.5 | 0.4 | 0.5 | 0.4 | — | 0.05 | 0.05 | — | — | balance |
| | C16 | 0.5 | 0.4 | 0.01 | 1.1 | — | 0.05 | 0.05 | — | — | balance |
| | C17 | 0.01 | 0.4 | 0.2 | 1.1 | — | 0.05 | 0.05 | — | — | balance |

By employing the listed alloys, the filler material in Table 1 was combined over one surface of the core alloy, and the sacrificial anode material in Table 2 was combined over the other surface of the core alloy. The cladding rates of the filler material and the sacrificial anode material were each set to 10%. The combined laminate was subjected to a heating step under conditions of 520° C. for 3 hours, and then to the hot clad-rolling step, whereby a three layer clad strip having a thickness of 3.5 mm was fabricated. The three layer clad strip was subjected to cold rolling, then to intermediate annealing under conditions of holding the strip at 400° C. for 5 hours, and then to final cold rolling. As a result, a brazing sheet sample having a temper grade H1n and a final sheet thickness of 0.3 mm was fabricated. For each sample, a rolling reduction rate after the intermediate annealing was set to 40%. When the sample was rolled until reaching the final sheet thickness of 0.3 mm without causing any problems in the manufacturing process described above, manufacturability was rated as "○" (acceptable). When the sample was not rolled until reaching the final sheet thickness of 0.3 mm due to the occurrence of cracking during the casting or the rolling, manufacturability was rated by as "X" (unacceptable). The rating results are listed in Tables 4 to 6.

TABLE 4

| | No | Filler material | Sacrificial Anode Material | Core | Manufacturability | Brazing Properties | Tensile Strength After Brazing (MPa) | Pitting Potential (mV) Sacrificial Anode Material | Joined Portion | Potential Difference Between Core/Brazing Material | Corrosion Resistance Filler material Side | | | | | Sacrificial Anode Material Side | |
|---|---|---|---|---|---|---|---|---|---|---|---|---|---|---|---|---|---|
| | | | | | | | | | | | (A) | (B) | (C) | (D) | (E) | (F) | (G) |
| (1) | 1 | A1 | B1 | C1 | ○ | ○ | 173(○) | −720 | −640 | 98 | ○ | ◎ | ◎ | ◎ | ◎ | ○ | ○ |
| | 2 | A2 | B1 | C1 | ○ | ○ | 171(○) | −721 | −651 | 91 | ○ | ◎ | ◎ | ◎ | ◎ | ○ | ○ |
| | 3 | A3 | B1 | C1 | ○ | ○ | 177(○) | −720 | −663 | 85 | ○ | ◎ | ◎ | ◎ | ◎ | ○ | ○ |
| | 4 | A4 | B1 | C1 | ○ | ○ | 177(○) | −722 | −668 | 74 | ○ | ◎ | ◎ | ◎ | ◎ | ○ | ○ |
| | 5 | A5 | B1 | C1 | ○ | ○ | 175(○) | −715 | −672 | 63 | ○ | ◎ | ◎ | ◎ | ◎ | ○ | ○ |
| | 6 | A6 | B1 | C1 | ○ | ○ | 172(○) | −721 | −661 | 45 | ○ | ◎ | ◎ | ◎ | ◎ | ○ | ○ |
| | 7 | A7 | B1 | C1 | ○ | ○ | 171(○) | −720 | −650 | 32 | ○ | ◎ | ◎ | ○ | ○ | ○ | ○ |
| | 8 | A8 | B2 | C1 | ○ | ○ | 170(○) | −701 | −685 | 120 | ○ | ◎ | ◎ | ◎ | ◎ | ○ | ○ |
| | 9 | A9 | B2 | C1 | ○ | ○ | 172(○) | −703 | −672 | 63 | ○ | ◎ | ◎ | ◎ | ◎ | ○ | ○ |
| | 10 | A10 | B2 | C1 | ○ | ○ | 171(○) | −700 | −665 | 28 | ○ | ◎ | ◎ | ○ | ○ | ○ | ○ |
| (2) | 11 | A11 | B1 | C1 | ○ | X | — | — | — | — | — | — | — | — | — | — | — |
| | 12 | A12 | B1 | C1 | ○ | X | — | — | — | — | — | — | — | — | — | — | — |
| | 13 | A13 | B1 | C1 | ○ | ○ | 172(○) | −720 | −625 | 16 | ○ | ◎ | ◎ | X | X | ○ | ○ |
| | 14 | A14 | B1 | C1 | ○ | ○ | 171(○) | −718 | −730 | 85 | ○ | ◎ | ◎ | ◎ | ◎ | ○ | X |
| | 15 | A15 | B4 | C1 | ○ | ○ | 174(○) | −750 | −765 | 77 | ○ | ◎ | ◎ | ◎ | ◎ | ○ | X |
| | 16 | A16 | B4 | C1 | ○ | ○ | 177(○) | −751 | −760 | 56 | ○ | ◎ | ◎ | ◎ | ◎ | ○ | X |
| | 17 | A17 | B1 | C1 | ○ | ○ | 172(○) | −720 | −668 | 15 | ○ | ◎ | ◎ | X | X | ○ | ○ |
| | 18 | A18 | B1 | C1 | ○ | X | — | — | — | — | — | — | — | — | — | — | — |
| | 19 | A19 | B1 | C1 | X | — | — | — | — | — | — | — | — | — | — | — | — |

(1) Inventive Example, (2) Comparative Example (A) CASS test, (B) Solution A, (C) Solution B, (D) Solution C, (E) Solution D, (F) General Body, and (G) Joint portion

TABLE 5

| | | No | Filler material | Sacrificial Anode Material | Core | Manufacturability | Brazing Properties | Tensile Strength After Brazing (MPa) | Pitting Potential (mV) Sacrificial Anode Material | Pitting Potential (mV) Joined Portion | Potential Difference Between Core/Brazing Material | Corrosion Resistance Filler material Side (A) | (B) | (C) | (D) | (E) | Sacrificial Anode Material Side (F) | (G) |
|---|---|---|---|---|---|---|---|---|---|---|---|---|---|---|---|---|---|---|
| (1) | | 20 | A3 | B2 | C1 | ○ | ○ | 171(○) | −700 | −650 | 60 | ○ | ◎ | ◎ | ◎ | ◎ | ○ | ○ |
| | | 21 | A3 | B3 | C1 | ○ | ○ | 174(○) | −745 | −672 | 62 | ○ | ◎ | ◎ | ◎ | ◎ | ○ | ○ |
| | | 22 | A3 | B4 | C1 | ○ | ○ | 174(○) | −752 | −675 | 62 | ○ | ◎ | ◎ | ◎ | ◎ | ○ | ○ |
| | | 23 | A3 | B5 | C1 | ○ | ○ | 175(○) | −710 | −657 | 64 | ○ | ◎ | ◎ | ◎ | ◎ | ○ | ○ |
| | | 24 | A3 | B6 | C1 | ○ | ○ | 175(○) | −722 | −661 | 60 | ○ | ◎ | ◎ | ◎ | ◎ | ○ | ○ |
| | | 25 | A3 | B7 | C1 | ○ | ○ | 171(○) | −716 | −659 | 58 | ○ | ◎ | ◎ | ◎ | ◎ | ○ | ○ |
| (2) | | 26 | A3 | B8 | C1 | ○ | ○ | 171(○) | −690 | −662 | 60 | ○ | ◎ | ◎ | ◎ | ◎ | X | ○ |
| | | 27 | A3 | B9 | C1 | X | — | — | — | — | — | — | — | — | — | — | — | — |
| | | 28 | A3 | B10 | C1 | X | — | — | — | — | — | — | — | — | — | — | — | — |
| | | 29 | A3 | B11 | C1 | ○ | ○ | 172(○) | −691 | −645 | 61 | ○ | ◎ | ◎ | ◎ | ◎ | X | ○ |
| | | 30 | A3 | B12 | C1 | ○ | ○ | 177(○) | −796 | −681 | 58 | ○ | ◎ | ◎ | ◎ | ◎ | X | ○ |

(1) Inventive Example, (2) Comparative Example
(A) CASS test, (B) Solution A, (C) Solution B, (D) Solution C, (E) Solution D, (F) General Body, and (G) Joint portion

TABLE 6

| | | No | Filler material | Sacrificial Anode Material | Core | Manufacturability | Brazing Properties | Tensile Strength After Brazing (MPa) | Pitting Potential (mV) Sacrificial Anode Material | Pitting Potential (mV) Joined Portion | Potential Difference Between Core/Brazing Material | Corrosion Resistance Filler material Side (A) | (B) | (C) | (D) | (E) | Sacrificial Anode Material Side (F) | (G) |
|---|---|---|---|---|---|---|---|---|---|---|---|---|---|---|---|---|---|---|
| (1) | | 31 | A3 | B1 | C2 | ○ | ○ | 197(○) | −720 | −662 | 55 | ○ | ◎ | ◎ | ◎ | ◎ | ○ | ○ |
| | | 32 | A3 | B1 | C3 | ○ | ○ | 182(○) | −721 | −660 | 63 | ○ | ◎ | ◎ | ◎ | ◎ | ○ | ○ |
| | | 33 | A3 | B1 | C4 | ○ | ○ | 178(○) | −723 | −660 | 63 | ○ | ◎ | ◎ | ◎ | ◎ | ○ | ○ |
| | | 34 | A3 | B1 | C5 | ○ | ○ | 173(○) | −717 | −658 | 62 | ○ | ◎ | ◎ | ◎ | ◎ | ○ | ○ |
| | | 35 | A3 | B1 | C6 | ○ | ○ | 165(○) | −720 | −657 | 60 | ○ | ◎ | ◎ | ◎ | ◎ | ○ | ○ |
| | | 36 | A3 | B1 | C7 | ○ | ○ | 189(○) | −720 | −661 | 60 | ○ | ◎ | ◎ | ◎ | ◎ | ○ | ○ |
| | | 37 | A3 | B1 | C8 | ○ | ○ | 193(○) | −721 | −661 | 59 | ○ | ◎ | ◎ | ◎ | ◎ | ○ | ○ |
| (2) | | 38 | A3 | B1 | C9 | ○ | X | — | — | — | — | — | — | — | — | — | — | — |
| | | 39 | A3 | B1 | C10 | ○ | X | — | — | — | — | — | — | — | — | — | — | — |
| | | 40 | A3 | B1 | C11 | X | — | — | — | — | — | — | — | — | — | — | — | — |
| | | 41 | A3 | B1 | C12 | X | — | — | — | — | — | — | — | — | — | — | — | — |
| | | 42 | A3 | B1 | C13 | X | — | — | — | — | — | — | — | — | — | — | — | — |
| | | 43 | A3 | B1 | C14 | X | — | — | — | — | — | — | — | — | — | — | — | — |
| | | 44 | A3 | B1 | C15 | ○ | ○ | 132(X) | −720 | −665 | 61 | ○ | ◎ | ◎ | ◎ | ◎ | ○ | ○ |
| | | 45 | A3 | B1 | C16 | ○ | ○ | 129(X) | −723 | −661 | 62 | ○ | ◎ | ◎ | ◎ | ◎ | ○ | ○ |
| | | 46 | A3 | B1 | C17 | ○ | ○ | 135(X) | −720 | −660 | 62 | ○ | ◎ | ◎ | ◎ | ◎ | ○ | ○ |

(1) Inventive Example, (2) Comparative Example
(A) CASS test, (B) Solution A, (C) Solution B, (D) Solution C, (E) Solution D, (F) General Body, and (G) Joint portion Table 4 lists the results obtained by evaluating each blazing sheet sample on the following items. Regarding the samples for which manufacturability was rated as "x" (unacceptable) in Table 4, the following items were not evaluated because the samples could not be fabricated. Furthermore, regarding the samples for which brazability were rated as "x" (unacceptable) in Table 4, other evaluation tests were omitted because evaluation of some items was infeasible.
(Evaluation of Brazability)

A material for a fin in a heat exchanger was obtained by preparing a fin material having a thickness of 0.07 mm, a temper grade H14, and an alloy composition of a 3003 aluminum alloy added with 1.0% of Zn, and corrugating the prepared fin material. The obtained fin material was disposed on the filler material surface of the brazing sheet sample, was immersed in a 5% aqueous solution of fluoride flux, and was subjected to heating at 600° C. for 3 minutes for the brazing, whereby a mini-core sample (a test piece called as "mini-core sample") was fabricated. The brazability was rated as acceptable (○) when a fin joining rate of the mini-core sample was not less than 95% and the brazing sheet sample was not melted. The brazability was rated as unacceptable (x) when the fin joining rate was less than 95% and/or the brazing sheet sample was melted.
(Measurement of Tensile Strength after Brazing)

After carrying out heat treatment at 600° C. for 3 minutes (corresponding to heating for the brazing) on the brazing sheet sample, the sample was subjected to a tensile test in conformity with JIS Z2241 under conditions of a tensile speed of 10 mm/min and a gauge length of 50 mm. Tensile strength was read from an obtained stress-strain curve. As a result, the brazing sheet sample was rated as acceptable (○) when the tensile strength was not less than 150 MPa, and as unacceptable (x) when the tensile strength was less than 150 MPa.

(Measurement of Pitting Potential)

Figure 1:
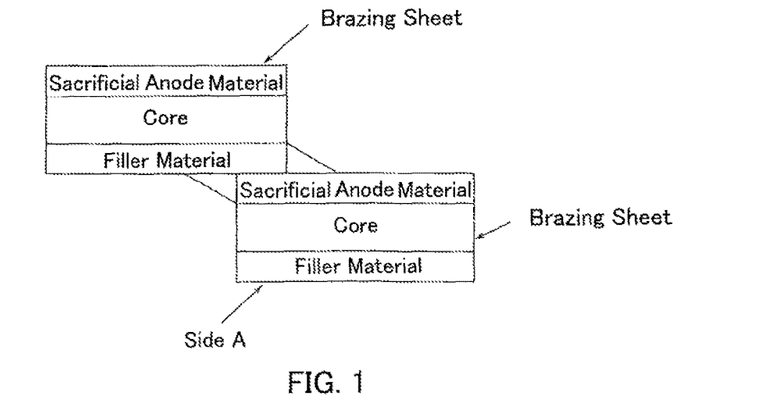
FIG. 1 is a schematic view of a sample for use in measurement of a pitting potential of an aluminum alloy brazing sheet having high corrosion resistance according to the present invention, and in a corrosion test on the sacrificial anode material side of the aluminum alloy brazing sheet.

The filler material surface and the sacrificial anode material surface of the brazing sheet sample were overlapped with each other as illustrated in FIG. 1. A 5% aqueous solution of fluoride flux was applied to an overlapped portion and then dried. Subsequently, the brazing sheet sample after the drying was entirely covered with a stainless foil and was subjected to heating for the brazing at 600° C. for 3 minutes, whereby a composite sample was fabricated. An aqueous solution with pH 3 was prepared by dissolving NaCl in pure water to prepare a 5 weight % aqueous solution of NaCl, and by adding acetic acid to it.

The composite sample was immersed in the prepared solution, and polarization measurement was performed while a potential was scanned from 0 to −300 mV by employing a potentiostat under bubbling with nitrogen gas. Regions to be measured were set in the surface of the filler material, the surface of the sacrificial anode material, the surface of the joint portion, and the surface of the core. In each measurement process, the sample was masked using an insulating resin such that only the region to be measured was exposed. When performing the measurement of the core, the core surface was exposed before the measurement by immersing the sample in a solution of NaOH. Table 4 lists respective values of the pitting potential at the sacrificial anode material surface, the pitting potential at the joint portion surface, and the difference in pitting potential between the core and the filler material surface, which values were each obtained by reading the pitting potential from an anode polarization curve obtained as described above. Here, the difference in pitting potential between the core and the filler material surface means a value obtained by subtracting the pitting potential at the filler material surface from the pitting potential of the core.

(Corrosion Resistance on Filler Material Side)

The same mini-core sample as that used for evaluating the brazability was also subjected to a CASS test (Copper Accelerated Acetic Acid Salt Spray Test) for 1000 hours in conformity with JIS-H 8502 by masking the sacrificial anode material surface of the brazing sheet with an insulating resin and by employing the filler material surface thereof as a test surface. As a result, CASS corrosion resistance was rated as acceptable (○) when corrosion penetration was not generated in the brazing sheet, and as unacceptable (x) when corrosion penetration was generated in the brazing sheet.

Moreover, the mini-core sample masked in a similar way was subjected to a cyclic corrosion test, which includes spraying for 2 hours (spray amount of 1 to 2 ml/80 cm²/h), drying for 2 hours (relative humidity of 20 to 30%), wetting for 2 hours (relative humidity of not lower than 95%), by employing a cyclic corrosion testing apparatus. Spray liquids were prepared as aqueous solutions having compositions listed in Table 7. A temperature in a test tank was set to 50° C., and a test time was set to 3000 hours. After the end of the test, corrosion products were removed using concentrated sulfuric acid, and the depth of a corrosion hole generated in the sacrificial anode material surface was measured by the focal depth method. Maximum one of measured values was taken as a corrosion depth. In the evaluation using each of aqueous solutions A, B, C and D, the sample was rated as superior (⊚) when the corrosion depth was less than 100 μm, as acceptable (○) when the corrosion depth was not less than 100 μm and less than 150 μm, and as unacceptable (x) when the corrosion depth was not less than 150 μm.

TABLE 7

| | Hydrochloric Acid | Sulfuric Acid | Nitric Acid | Acetic Acid | Formic Acid | Total |
|---|---|---|---|---|---|---|
| Solution A | 6 | 10 | 10 | 5000 | 5000 | 10026 |
| Solution B | 3 | 10 | 10 | 5000 | 5000 | 10023 |
| Solution C | 6 | 10 | 10 | 10 | 10 | 46 |
| Solution D | 500 | 8000 | 400 | 400 | 400 | 9700 |

(Unit: ppm)

(Corrosion Resistance on Sacrificial Anode Material Side)

The sacrificial anode material surface was prepared as a test surface by masking the filler material side (side A in FIG. 1) of the composite sample, obtained as described above, with insulating resin. The composite sample was subjected to a cyclic immersion test for 3 months by repeating, as one cycle, the steps of immersing the sample in hot water, containing 500 ppm of Cl⁻, 100 ppm of $SO_4^{2-}$, and 10 ppm of $Cu^{2+}$, at 88° C. for 8 hours, and then leaving the sample to stand at room temperature for 16 hours. As a result, corrosion resistance in a general body was rated as acceptable (○) when corrosion penetration was not generated in the brazing sheet, and as unacceptable (x) when corrosive penetration was generated in the brazing sheet. Furthermore, corrosion resistance in the joint portion was rated as acceptable (○) when peeling-off of the joint portion was not generated in the joint portion, and as unacceptable (x) when peeling-off of the joint portion was generated due to corrosion.

In Inventive Examples 1 to 10, 20 to 25, and 31 to 37, the conditions specified in the present invention were satisfied, and the acceptable results were obtained in all of the manufacturability, the brazability, the tensile length after brazing, and the corrosion resistance.

In contrast, in Comparative Example 11, the brazability were unacceptable for the reason that the Si component in the filler material was too less.

In Comparative Example 12, the brazability were unacceptable for the reason that the Si component in the filler material was too much.

In Comparative Example 13, the corrosion resistance on the filler material side against the solutions C and D was unacceptable for the reason that the Cu component in the filler material was too much and hence the difference in pitting potential between the core and the filler material surface was too small.

In Comparative Example 14, the corrosion resistance of the joint portion on the sacrificial anode material side was unacceptable for the reason that the Cu component in the filler material was too less and hence the pitting potential at the sacrificial anode material surface became higher than the pitting potential at the joint portion surface.

In Comparative Example 15, the corrosion resistance of the joint portion on the sacrificial anode material side was unacceptable for the reason that the Zn component in the filler material was too much and hence the pitting potential at the sacrificial anode material surface became higher than the pitting potential at the joint portion surface.

In Comparative Example 16, the corrosion resistance of the joint portion on the sacrificial anode material side was unacceptable for the reason that the Zn component in the filler material was too much and hence the pitting potential at the sacrificial anode material surface became higher than the pitting potential at the joint portion surface.

In Comparative Example 17, the corrosion resistance on the filler material side against the solutions C and D was unacceptable for the reason that the Zn component in the filler material was too less and hence the difference in pitting potential between the core and the filler material surface was too small.

In Comparative Example 18, the brazability were inferior for the reason that the Fe component in the filler material was too much.

In Comparative Example 19, the manufacturability was unacceptable for the reason that the Mn, Ti, Zr, Cr and V components in the filler material were too much, whereby cracking occurred during the rolling, so that the brazing sheet could not be fabricated.

In Comparative Example 26, the corrosion resistance of the general body on the sacrificial anode material side was unacceptable for the reason that the Si component in the sacrificial anode material was too much.

In Comparative Example 27, the manufacturability was unacceptable for the reason that the Fe component in the sacrificial anode material was too much, whereby cracking occurred during the rolling, so that the brazing sheet could not be fabricated.

In Comparative Example 28, the manufacturability was unacceptable for the reason that the Mn, Ti, Zr, Cr and V components in the sacrificial anode material were too much, whereby cracking occurred during the rolling, so that the brazing sheet could not be fabricated.

In Comparative Example 29, the corrosion resistance of the general body on the sacrificial anode material side was unacceptable for the reason that the Zn component in the sacrificial anode material was too less.

In Comparative Example 30, the corrosion resistance of the general body on the sacrificial anode material side was unacceptable for the reason that the Zn component in the sacrificial anode material was too much.

In Comparative Example 38, the brazability was unacceptable for the reason that the Si component in the core was too less.

In Comparative Example 39, the brazability was unacceptable for the reason that the Mg component in the core was too much.

In Comparative Example 40, the manufacturability was unacceptable for the reason that the Fe component in the core was too much, whereby cracking occurred during the rolling, so that the brazing sheet could not be fabricated.

In Comparative Example 41, the manufacturability was unacceptable for the reason that the Ti, Zr, Cr and V components in the core were too much, whereby cracking occurred during the rolling, so that the brazing sheet could not be fabricated.

In Comparative Example 42, the manufacturability was unacceptable for the reason that the Mn component in the core was too much, whereby cracking occurred during the rolling, so that the brazing sheet could not be fabricated.

In Comparative Example 43, the manufacturability was unacceptable for the reason that the Cu component in the core was too much, whereby cracking occurred during the casting, so that the brazing sheet could not be fabricated.

In Comparative Example 44, the tensile strength after the brazing was unacceptable for the reason that the Mn component in the core was too less.

In Comparative Example 45, the tensile strength after the brazing was unacceptable for the reason that the Cu component in the core was too less.

In Comparative Example 46, the tensile strength after the brazing was unacceptable for the reason that the Si component in the core was too less.

INDUSTRIAL APPLICABILITY

The present invention can provide an aluminum alloy brazing sheet used as, e.g., a material for a tube in a heat exchanger where inner and outer surface of the tube are both exposed to corrosive environment and it is difficult to develop sacrificial anticorrosion with a fin at a joined surface between the tube and the fin. Such an aluminum alloy brazing sheet having high corrosion resistance develops the sacrificial anticorrosion effect in both the inner and outer surfaces of the tube, has the brazing function in one surface of the sheet, and is able to prevent the occurrence of preferential corrosion between the tube materials. Moreover, the aluminum alloy brazing sheet is superior in not only brazability, such as a fin joining rate and erosion resistance, but also in lightweight properties and thermal conductivity. The present invention can further provide a channel forming component for a vehicular heat exchanger, the component being made of the aluminum alloy brazing sheet having high corrosion resistance.

The invention claimed is:

1. A channel forming component for a vehicular heat exchanger, made from a brazing sheet, the channel forming component having a joint between a filler material on one end of a brazing sheet and a sacrificial anode material on the other end of the brazing sheet, comprising an aluminum alloy core, a filler material clad on one surface of the core, and a sacrificial anode material clad on the other surface of the core, the filler material being made of an aluminum alloy containing Si: 2.5 to 13.0 mass %, Zn: 0.5 to 5.5 mass %, Cu: 0.1 to 0.4 mass %, and Fe: 0.05 to 1.0 mass % with the balance being Al and inevitable impurities, the sacrificial anode material being made of an aluminum alloy containing Zn: 0.5 to 6.0 mass %, Si: 0.05 to 1.5 mass %, and Fe: 0.05 to 2.0 mass % with the balance being Al and inevitable impurities, and the core being made of an aluminum alloy containing Si: 0.05 to 1.2 mass %, Fe: 0.05 to 1.0 mass %, Cu: 0.05 to 1.2 mass %, and Mn: 0.6 to 1.8 mass % with the balance being Al and inevitable impurities, wherein a difference in pitting potential between a filler material surface and the core after heating for brazing is not less than 20 mV, and a pitting potential at a sacrificial anode material surface after the heating for the brazing is equal to or lower than a pitting potential of an eutectic structure in the filler material.

2. The channel forming component made from an aluminum alloy brazing sheet having high corrosion resistance according to claim 1, wherein at least one of the filler material and the sacrificial anode material contains, in addition to the aforesaid component elements, one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %.

3. The channel forming component made from an aluminum alloy brazing sheet having high corrosion resistance according to claim 1, wherein the core consists of Si: 0.05 to 1.2 mass %, Fe: 0.05 to 1.0 mass %, Cu: 0.05 to 1.2 mass %, and Mn: 0.6 to 1.8 mass %, and one or more selected from Mg: 0.05 to 0.5 mass %, Zr: 0.05 to 0.3 mass %, Cr: 0.05 to 0.3 mass %, and V: 0.05 to 0.3 mass %, with the balance being Al and inevitable impurities.

4. The channel forming component made from an aluminum alloy brazing sheet having high corrosion resistance according to claim 1, wherein the aluminum alloy brazing sheet is formed as a channel forming component for a vehicular heat exchanger, the channel forming component having one surface defining a channel for a cooling liquid and the other surface being contacted with air, and wherein the channel forming component is used in environment where condensate water is generated on the other surface of the channel forming component, the condensate water having a total value of solute concentration of not more than 10000 ppm and containing a chloride ion of not less than 5 ppm and not more than 500 ppm.

5. The channel forming component made from an aluminum alloy brazing sheet having high corrosion resistance according to claim 2, wherein the core consists of Si: 0.05 to 1.2 mass %, Fe: 0.05 to 1.0 mass %, Cu: 0.05 to 1.2 mass %, and Mn: 0.6 to 1.8 mass %, and one or more selected from Mg: 0.05 to 0.5 mass %, Zr: 0.05 to 0.3 mass %, Cr: 0.05 to 0.3 mass %, and V: 0.05 to 0.3 mass % with the balance being Al and inevitable impurities.

6. The channel forming component made from an aluminum alloy brazing sheet having high corrosion resistance according to claim 2, wherein the aluminum alloy brazing sheet is formed as a channel forming component for a vehicular heat exchanger, the channel forming component having one surface defining a channel for a cooling liquid and the other surface being contacted with air, and wherein the channel forming component is used in environment where condensate water is generated on the other surface of the channel forming component, the condensate water having a total value of solute concentration of not more than 10000 ppm and containing a chloride ion of not less than 5 ppm and not more than 500 ppm.

7. The channel forming component made from an aluminum alloy brazing sheet having high corrosion resistance according to claim 3, wherein the aluminum alloy brazing sheet is formed as a channel forming component for a vehicular heat exchanger, the channel forming component having one surface defining a channel for a cooling liquid and the other surface being contacted with air, and wherein the channel forming component is used in environment where condensate water is generated on the other surface of the channel forming component, the condensate water having a total value of solute concentration of not more than 10000 ppm and containing a chloride ion of not less than 5 ppm and not more than 500 ppm.

8. A channel forming component for a vehicular heat exchanger, manufactured by brazing the aluminum alloy brazing sheet having high corrosion resistance according to claim 4.

9. An aluminum alloy brazing sheet having high corrosion resistance for forming a channel forming component for a vehicular heat exchanger, the channel forming component having a joint between a filler material on one end of a brazing sheet and a sacrificial anode material on the other end of the brazing sheet, comprising an aluminum alloy core, a filler material clad on one surface of the core, and a sacrificial anode material clad on the other surface of the core, the filler material being made of an aluminum alloy containing Si: 2.5 to 13.0 mass %, Zn: 0.5 to 5.5 mass %, Cu: 0.1 to 0.4 mass %, and Fe: 0.05 to 1.0 mass % with the balance being Al and inevitable impurities, the sacrificial anode material being made of an aluminum alloy consisting of Zn: 0.5 to 6.0 mass %, Si: 0.05 to 1.5 mass %, and Fe: 0.05 to 2.0 mass %, and one or more selected from Ti: 0.05 to 0.3 mass %, Zr: 0.05 to 0.3 mass %, Cr: 0.05 to 0.3 mass %, and V: 0.05 to 0.3 mass %, with the balance being Al and inevitable impurities, and the core being made of an aluminum alloy containing Si: 0.05 to 1.2 mass %, Fe: 0.05 to 1.0 mass %, Cu: 0.05 to 1.2 mass %, and Mn: 0.6 to 1.8 mass % with the balance being Al and inevitable impurities, wherein a difference in pitting potential between a filler material surface and the core after heating for brazing is not less than 20 mV, and a pitting potential at a sacrificial anode material surface after the heating for the brazing is equal to or lower than a pitting potential of an eutectic structure in the filler material.

10. The channel forming component made from an aluminum alloy brazing sheet having high corrosion resistance according to claim 1, wherein the filler material contains, in addition to the aforesaid component elements, one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %.

11. The aluminum alloy brazing sheet having high corrosion resistance according to claim 9, wherein the filler material contains, in addition to the aforesaid component elements, one or more selected from Mn: 0.05 to 1.8 mass %, Ti: 0.05 to 0.3 mass %, Zr: 0.05 to 0.3 mass %, Cr: 0.05 to 0.3 mass %, and V: 0.05 to 0.3 mass %.

12. The aluminum alloy brazing sheet having high corrosion resistance according to claim 9, wherein the core further contains, in addition to the aforesaid component elements, one or more selected from Mg: 0.05 to 0.5 mass %, Zr: 0.05 to 0.3 mass %, Cr: 0.05 to 0.3 mass %, and V: 0.05 to 0.3 mass %.

13. The channel forming component made from an aluminum alloy brazing sheet having high corrosion resistance according to claim 10, wherein the core further contains, in addition to the aforesaid component elements, one or more selected from Mg: 0.05 to 0.5 mass %, Ti: 0.05 to 0.3 mass %, Zr: 0.05 to 0.3 mass %, Cr: 0.05 to 0.3 mass %, and V: 0.05 to 0.3 mass %.

14. The aluminum alloy brazing sheet having high corrosion resistance according to claim 9, wherein the aluminum alloy brazing sheet is formed as a channel forming component for a vehicular heat exchanger, the channel forming component having one surface defining a channel for a cooling liquid and the other surface being contacted with air, and wherein the channel forming component is used in environment where condensate water is generated on the other surface of the channel forming component, the condensate water having a total value of solute concentration of not more than 10000 ppm and containing a chloride ion of not less than 5 ppm and not more than 500 ppm.

15. The channel forming component made from an aluminum alloy brazing sheet having high corrosion resistance according to claim 10, wherein the aluminum alloy brazing sheet is formed as a channel forming component for a vehicular heat exchanger, the channel forming component having one surface defining a channel for a cooling liquid and the other surface being contacted with air, and wherein the channel forming component is used in environment where condensate water is generated on the other surface of the channel forming component, the condensate water having a total value of solute concentration of not more than 10000 ppm and containing a chloride ion of not less than 5 ppm and not more than 500 ppm.

16. An aluminum alloy brazing sheet having high corrosion resistance for forming a channel forming component for a vehicular heat exchanger, the channel forming component having a joint between a filler material and a sacrificial anode material on opposite ends of the brazing sheet, comprising an aluminum alloy core, a filler material clad on one surface of the core, and a sacrificial anode material clad on the other surface of the core, the filler material being made of an aluminum alloy containing Si: 2.5 to 13.0 mass %, Zn: 0.5 to 5.5 mass %, Cu: 0.1 to 0.4 mass %, and Fe 0.05 to 1.0 mass %, with the balance being Al and inevitable impurities, the sacrificial anode material being made of an aluminum alloy containing Zn: 0.5 to 6.0 mass %, Si: 0.05 to 1.5 mass, and Fe: 0.05 to 2.0 mass %, with the balance being Al and inevitable impurities, and the core being made of an aluminum alloy consisting of Si: 0.05 to 1.2 mass %, Fe: 0.05 to 1.0 mass %, Cu: 0.05 to 1.2 mass %, and Mn: 0.6 to 1.8 mass %, and one or more selected from Mg: 0.05 to 0.5 mass %, Zr: 0.05 to 0.3 mass %, Cr: 0.05 to 0.3 mass %, and V: 0.05 to 0.3 mass %, with the balance being Al and inevitable impurities, wherein a difference in pitting potential between a filler material surface and the core after heating for brazing is not less than 20 mV, and a pitting potential at a sacrificial anode material surface after the heating for the brazing is equal to or lower than a pitting potential of an eutectic structure in the filler material.

* * * * *